C. W. LUND.
MOTOR DRIVEN STREET SWEEPER.
APPLICATION FILED APR. 11, 1919.

1,374,933.

Patented Apr. 19, 1921.
7 SHEETS—SHEET 1.

Inventor
Charles W. Lund
By H. B. Willson &co
Attorneys

C. W. LUND.
MOTOR DRIVEN STREET SWEEPER.
APPLICATION FILED APR. 11, 1919.

1,374,933.

Patented Apr. 19, 1921.
7 SHEETS—SHEET 6.

Inventor
Charles W. Lund
By H. B. Willson &co
Attorneys

UNITED STATES PATENT OFFICE.

CHARLES WALTER LUND, OF WILLOWS, CALIFORNIA.

MOTOR-DRIVEN STREET-SWEEPER.

1,374,933.

Specification of Letters Patent.  Patented Apr. 19, 1921.

Application filed April 11, 1919. Serial No. 289,326.

*To all whom it may concern:*

Be it known that I, CHARLES W. LUND, citizen of the United States, residing at Willows, in the county of Glenn and State of California, have invented certain new and useful Improvements in Motor-Driven Street-Sweepers; and I do declare the following to be a full, clear, and exact description of the invention, such as will enable others skilled in the art to which it appertains to make and use the same.

My invention has for its principal object to provide a highly efficient and durable, motor propelled machine for sweeping streets and carrying the sweepings to any required point for unloading.

In carrying out the above end, further objects are to provide for clean sweeping even on streets having irregular surfaces; to provide a brush which will not only sweep the streets, but create a strong current of air to carry the sweepings into a receiving compartment provided therefor; to provide for escape of the air from the machine, without permitting any dust or the like to escape; to provide a dead air chamber in which the dust may settle; to provide novel means for sacking the sweepings and unloading the filled sacks; to provide for cleaning and adjustment of the brush as required; and to provide novel trucks carrying the front wheels of the machine.

With the foregoing in view, the invention resides in the novel features of construction, and unique combinations of parts, hereinafter fully described and claimed, reference being made in the descriptive matter to the drawings described below.

Figure 1 is a side elevation of a machine constructed in accordance with my invention;

Fig. 3 is substantially a central vertical longitudinal section;

Fig. 3$^a$ is a detail transverse section on the plane indicated by the line 3$^a$ 3$^a$ of Fig. 3;

Reinforced by any appropriate frame structure, is a housing 1 of suitable size and shape, mounted on front and rear wheels 2 and 3, the former being driven while the latter may be steered by any well known means. The frame of the machine extends forwardly and carries two independent motors which may well be located in hoods 4 such as the ordinary automobile hood. In rear of the hoods 4, is a driver's seat 5, preferably located in a cab 6, and the steering wheel 7, together with all other controls, are suitably located within reach of the driver.

One of the motors above mentioned is adapted to drive the front wheels 2, while the power from the other motor is utilized for swiftly rotating the brush yet to be described. For illustrative purposes, I have shown sprocket chains 8 connecting the front wheels 2 with a transverse jack shaft 9 which is driven by any preferred or well known means from one of the motors; and another shaft 10 and sprocket chains 11 are provided for driving the brush.

Figure 2:
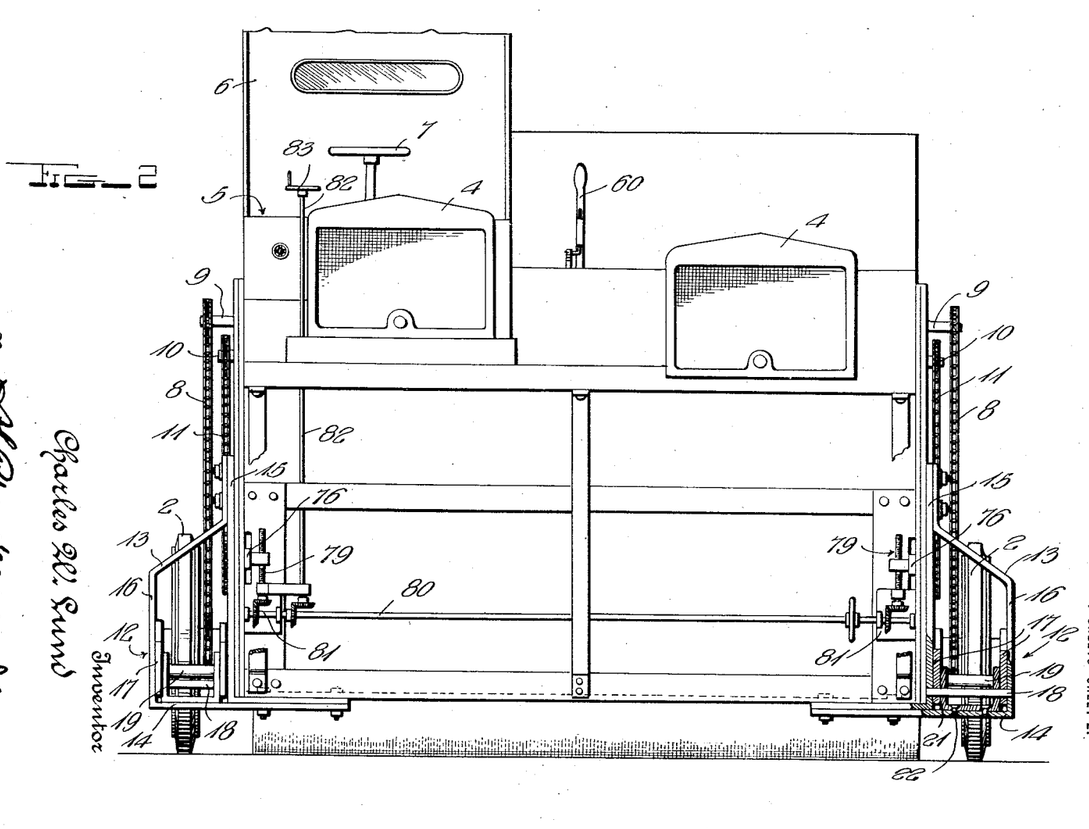
Fig. 2 is an end elevation.
Figure 2A:
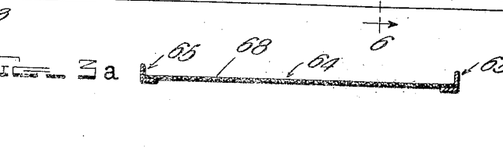
Figures 7, 9:
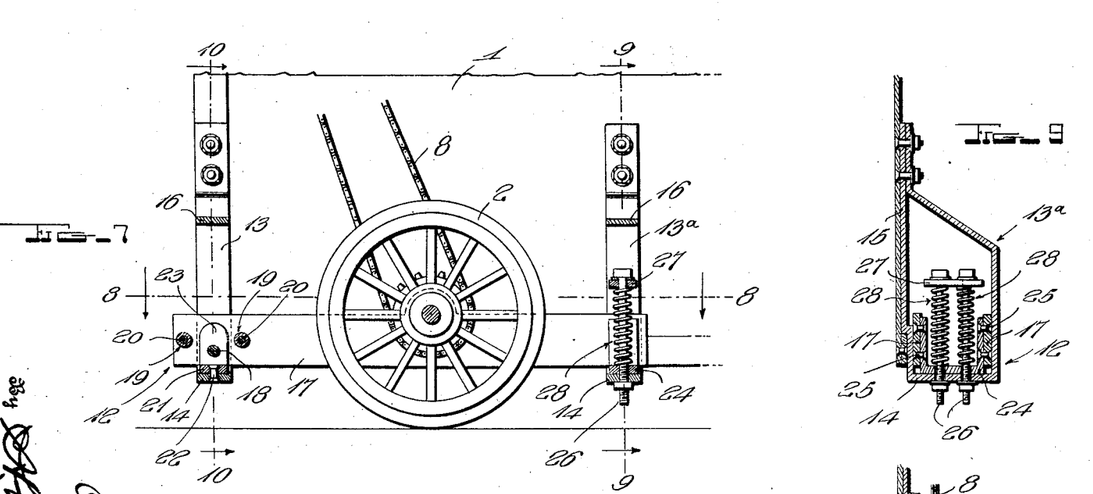
Fig. 7 is a side elevation with parts broken away and in section, showing one of the front wheel trucks.
Figs. 9 and 10 are vertical transverse sections on the planes designated by the lines 9—9 and 10—10 respectively of Fig. 7.
Figures 8, 10:
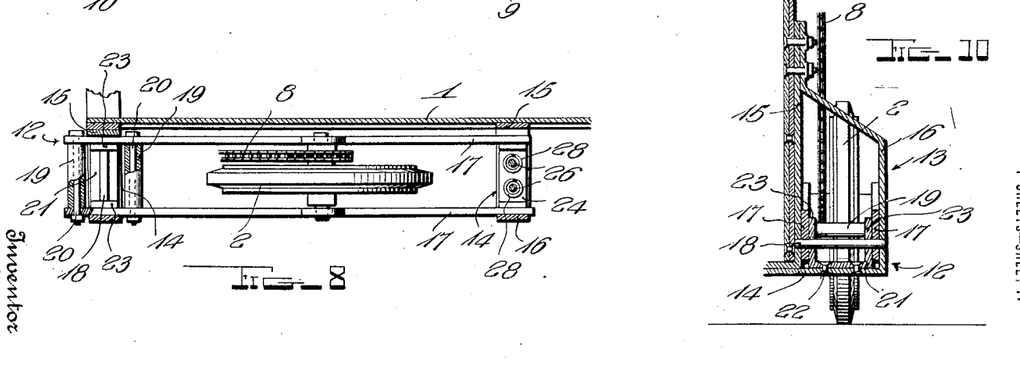
Fig. 8 is a horizontal section on the plane of the line 8—8 of Fig. 7.

The front wheels 2 might well be mounted in any suitable manner, but this is preferably done by means of trucks 12, one of which is detailed in Figs. 7 to 10. The front and rear brackets 13 and 13$^a$ respectively are rigidly secured to the sides of the housing 1 or to the frame of such housing as required, and each of said brackets includes a base 14, an inner side bar 15, and an outer side bar 16, the two bars 15 and 16 of each bracket being parallel throughout the greater part of their lengths and being by preference secured together at their upper ends as clearly shown in Figs. 2, 9 and 10. Two parallel horizontal bars 17 extend between the two brackets 13 and 13$^a$ and contact with the inner sides of the bars 15 and 16, and by means of a pin 18 passing through the front ends of said bars 17 and the bracket 13, the former are pivoted. Spacing sleeves 19, mounted on tie bolts 20, are preferably provided between the front ends of the bars 17 as illustrated in Figs. 7 and 8 and in addition, a U-shaped spacing bar 21 is by preference employed, the base of said bar being secured at 22 to the base 14 of the bracket 13, while the upturned ends 23 of said bar 21 are disposed for contact with the inner sides of the bars 17 as illustrated in Figs. 7, 8 and 10. The pin 18 passes through the ends 23 and said ends serve to guide the bars 17 in their pivotal movement upon the pin 18.

At their rear ends, the bars 17 are connected by a U-shaped bar 24 whose ends are riveted thereto at 25. (See Fig. 9). The bar 24 and the base 14 of the bracket 13ª are provided with alined openings through which vertical bolts 26 extend, said bolts rising above the bars 17 and carrying an abutment 27. Coil springs 28 are interposed between the abutment 27 and the bar 24 and it will thus be seen that since the wheel 2 is mounted between the bars 17, vertical movement of said wheel with respect to the remainder of the machine is yieldably resisted by the springs 28. The entire front end of the machine is thus mounted in a manner to permit the front wheels to drop into depressions or ride over obstructions, without warping or exerting a torsional action on the entire machine. The rear end of the machine is supported yieldably by means of springs 29 from the axle 30 of the wheels 3, and these parts are preferably located beneath the rearwardly projecting portion 31 of the housing 1.

The interior of the housing 1 is divided by front and rear transverse partitions 32 and 33, into a front brush compartment B, an intermediate receiving compartment R, and a dust collecting or dead air chamber C, the latter being located in the extended end 31 of the housing. In the compartment B, a rotary street sweeping brush 34 is mounted for sweeping the street and forcing the sweeping into the receiving chamber R, in a current of air generated by said brush; the compartment R is honeycombed with racks 35 to support sacks 36 in open position to receive the sweepings; and the chamber C merely forms a dead air space in which the dust settles and from which it may be removed through the door 37 indicated in Fig. 1.

Figure 6:
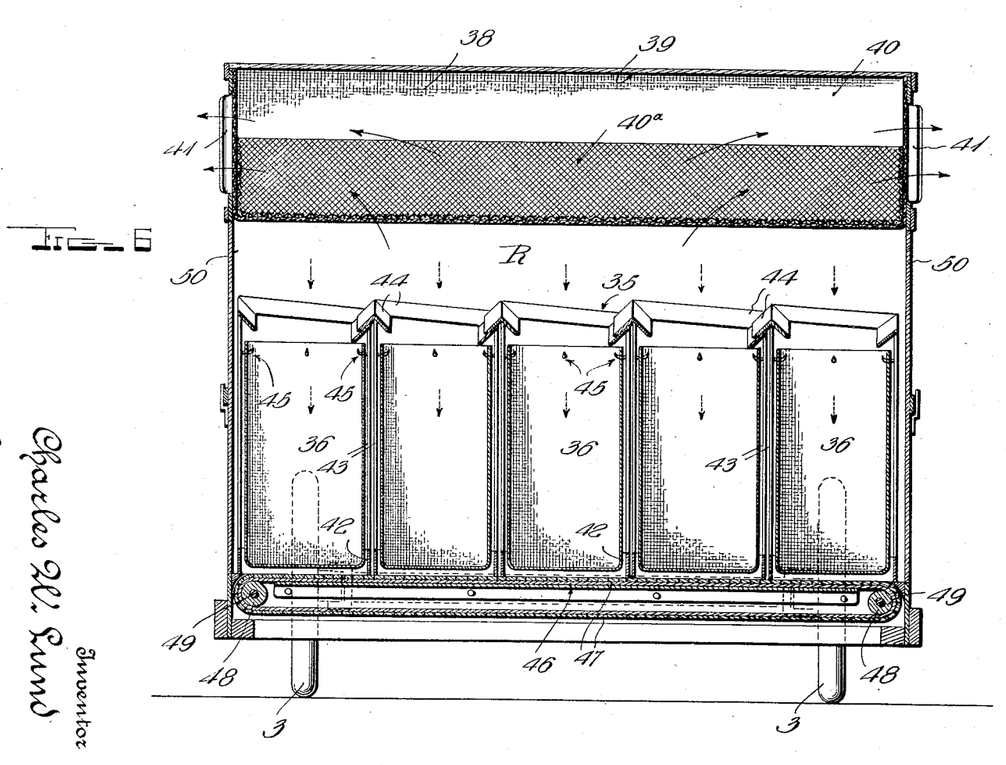
Fig. 6 is a transverse section through the receiving compartment and the sack racks and air outlet means thereof, taken on the plane of line 6—6 of Fig. 3.

To permit the air of the current generated by the rotating brush 34 to escape, without carrying dust and the like from the housing 1, I make novel improvision. A sheet or sheets of rather open mesh textile fabric 38 is positioned longitudinally in the upper portion of the housing 1 and is secured to the top of the latter upon spaced transverse lines 39 as will be clear from Figs. 3 and 6. The fabric 38 droops between the lines of fastenings 39 and thus forms a plurality of air outlet conduits 40 extending transversely across the interior of the housing 1 and communicating at their ends with the atmosphere by means of slots 41 stamped or otherwise formed in the sides of the housing. Due to the nature of the material of which the conduits 40 are formed, air may readily escape into said conduits and thence to the open air through the slots 41 (see Fig. 6). No dust or the like can enter the conduits to leave with the escaping air, the result being that this dust settles partly in the sacks 36, but principally in the dead air chamber C. To prevent collapse of the conduits 40, they are preferably provided with V-shaped skeletons 40ª formed of screen wire or the like. These skeletons retain the textile fabric 38 stretched in proper position for most effective screening of the outgoing air.

Each rack 35, above mentioned, consists of a rectangular base 42, rods 43 rising from and secured to said base, and a rectangular angle iron frame 44 secured to the upper ends of said rods. The several frames 44 are disposed in a common plane inclining upwardly from the partition 32 to the rear partition 33, and thus the sacks 36 are so held as to readily receive the sweepings thrown rearwardly by the brush 34. The angle iron frames 44 are disposed in abutting relation with their corners positioned upwardly so that they provide efficient means for guiding the sweepings into the sacks; and the latter may be supported in the racks in any preferred manner, for instance by the prongs 45 carried by the rods 43.

The receiving chamber R is provided with a solid bottom 46 and with an endless conveyer 47 operating over said bottom and around sprockets 48 on longitudinal shafts 49, the upper part of the conveyer serving to support the racks 35. Doors 50 are provided in the sides of the housing 1, at the ends of the receiving compartment R and by opening one door or the other and driving the conveyer 47 toward such door, the several racks 35 and the loaded sacks carried thereby may be shifted to either side of the machine for unloading, after which they may again be placed upon the conveyer 47 and returned to their initial places by proper movement of said conveyer.

Any adequate construction could be employed for operating the conveyer 47, but for illustrative purposes I have shown both shafts 49 provided with beveled gears 51 meshing with similar gears 52 on suitably mounted vertical shafts 53 having hand wheels 54. One hand wheel 54 and associated parts are provided at each side of the machine so that the conveyer may be operated without going from one side to the other.

The rotary brush 34 in the open bottomed compartment B, is mounted in an approximately cylindrical casing 55 and the line of contact of the brush with the street is in alinement with the points at which the front wheels 2 contact therewith and it will thus be seen that as these wheels travel over irregular surfaces and consequently raise and lower, the brush 34 will be correspondingly moved, thus insuring that clean sweeping shall take place even on exceptionally rough streets. At its upper side, the casing 55 is provided with an outlet 56 disposed somewhat on a tangent and it is through this outlet that the sweepings are forced in a current of air, into the receiving compartment R, as indicated by the arrows in Fig. 3. A sheet 57 of canvas or other flexible material extends from the front edge of the outlet 56 to the top of the compartment B and is secured to both so that vertical adjustment of the brush and its casing 55 is allowed, and the sweepings effectively guided into the receiving compartment regardless of the extent of adjustment. The portion 58 of the peripheral wall of the casing 55, at the rear edge of the outlet 56, may be hinged at 59 or otherwise mounted so that it may be moved inwardly against the ends of the brush bristles, and since these bristles travel toward the free edge of the portion 58, they may be effectively cleaned of any material which may have lodged thereon, whenever necessary. Any adequate means may be employed for depressing the yieldable wall portion 58, but for illustrative purposes I have shown a lever 60 and link 61, the former being accessible from the driver's seat.

The bottom of the casing 55 is formed with an opening 62 through which the brush 34 protrudes for contact with the street, and at the front, rear and ends of this opening, suitable curtains 63 depend from the casing 55 for contact with the street to prevent escape of any of the sweepings as they are operated upon by the brush. Within the front portion of the opening 62, I provide a flexible dust-pan 64 which is formed of two pairs of angle iron side members 65 hinged together and hinged at 67 to the casing 55, and a flexible, pliable bottom 68 extending between and secured to the said members 65 as illustrated in Figs. 3 and 3ª. By forming the bottom 68 of belting or the like, it will readily adapt itself to irregular street surfaces, being continually forced down by the brush bristles and will thus readily receive all sweepings gathered by the brush 34. One or more levers 69 may be suitably connected with the dustpan 64 for raising and lowering the same as required, and said lever or levers may well be operated by a rod 70 and lever 71 from the driver's seat.

When sweeping dry and dusty streets, it is preferable to moisten the brush 34, and for this purpose I have shown a water spray pipe 72 located in the rear part of the casing 55 and supplied with water from a tank 73 which may well be located in front of the conduits 40. Any adequate connections may be provided between the tank and the spray pipe and I have shown ordinary piping for this purpose, including a flexible section 74 to permit raising and lowering of the brush and its casing. A suitable valve 75 is provided for controlling the flow of water and for cutting it off entirely when required.

In the preceding, I have referred to vertical adjustment of the brush 34 and its casing 55, necessitating the flexible sheet 57 and the hose 74, and although such raising and lowering could be effected by any adequate means, I prefer the construction described below. A pair of longitudinal levers 76 are riveted or otherwise secured as at 77 to the ends of the casing 55 and the rear ends of said levers are fulcrumed upon the frame of the machine as indicated at 78 in Fig. 3. Screw jacks 79 are provided for raising and lowering the front ends of the levers 76 as required and suitable means are employed for adjusting both jacks simultaneously. In the present form of the machine, I have shown a transverse shaft 80 which operates the jacks 79 by means of gearing 81 as seen most clearly in Fig. 2, and by any suitable arrangement, such as a vertical shaft 82 and hand wheel 83, the shaft 80 may be turned by the driver whenever it is required that the brush and casing be either raised or lowered.

Figure 4:
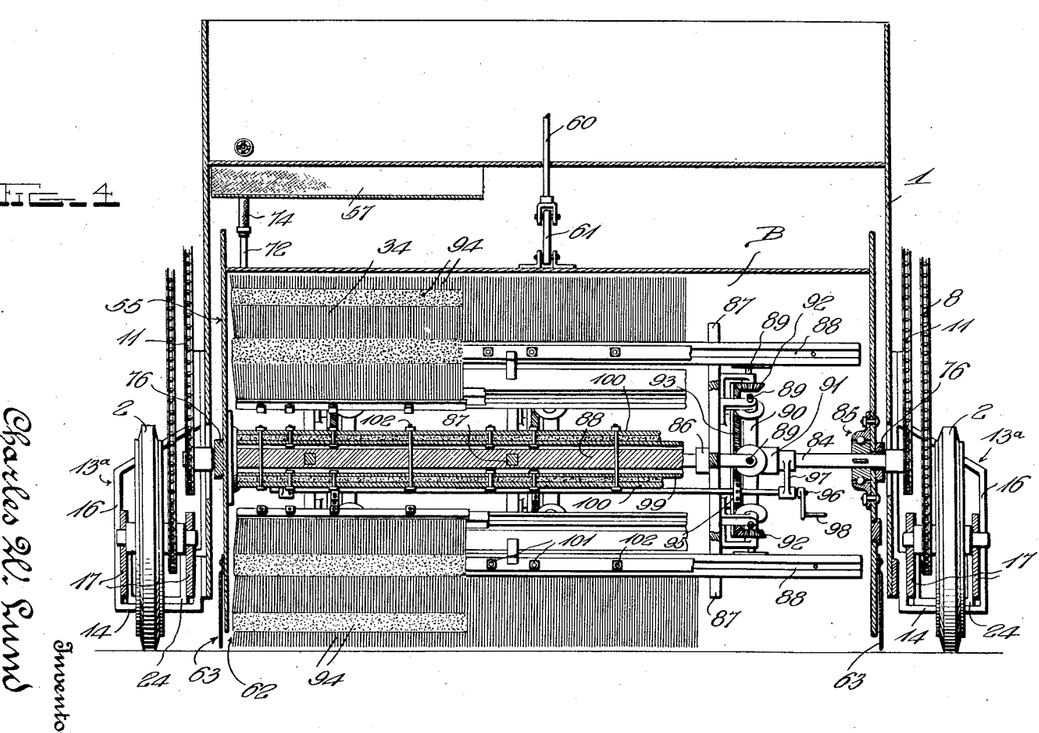
Fig. 4 is a vertical transverse section taken substantially on the irregular line 4—4 of Fig. 3, showing more particularly the construction of the rotary brush.
Figure 5:
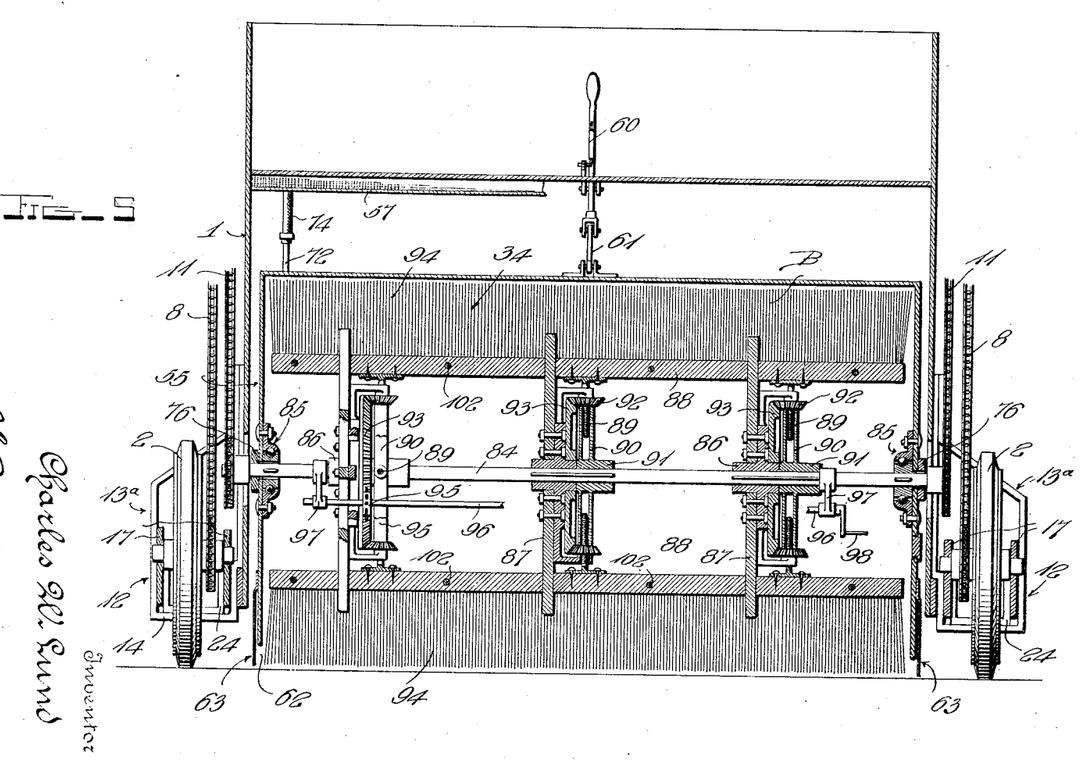
Fig. 5 is a vertical transverse section on the plane of the line 5—5 of Fig. 3.

The brush 34 could well be of any preferred construction, but is preferably of the form disclosed more particularly in Figs. 3, 4 and 5. The central shaft 84 of the brush is rotatably mounted in suitable bearings 85 carried by the bars 76 and is driven by the chains 11 above described; and at suitable intervals, hubs 86 are keyed on said shaft to carry rigid radial arms 87 upon which brush heads 88, extending parallel with the shaft 84, are slidably mounted as most clearly illustrated in Figs. 3 and 5. Jack screws 89 are secured to the brush heads 88 and are slidably received in tubular arms 90 radiating from additional hubs 91 on the shaft 84, and pinions 92 are threaded on said screws 89 and bear against the outer ends of the arms 90. Bevel gears 93 which are mounted on and rotatable with respect to the shaft 84, mesh with the pinions 92 for rotating them in unison and it will thus be seen that the brush heads 88 may be forced inwardly or outwardly as required, more particularly for the purpose of compensating for wear of the brush bristles 94. For simultaneously rotating the gears 93, pin gears or the like 95 may be carried by a shaft 96 extending parallel with the shaft 84 and carried by suitable bearing arms 97 secured to said shaft 84. A crank or the like 98 may be provided for turning shaft 96 as required.

I preferably attach the brush bristles 94 to the heads 88 in the manner illustrated more particularly in Figs. 3 and 4. The edges of each head are channeled to a slight extent for proper contact with channeled metal bars 99, between which and bars 100, the bristles are clamped by bolts 101 passing through the bars 99 and 100 and the intervening bristles. Longer bolts 102 pass through these parts and through the heads 88 to secure the former to the latter, at the same time permitting easy detachment thereof when necessary. If all of the bristles should become bowed in one direction from continual operation, the bolts 102 may be removed so that reversal of such bristles is possible, to exert strain thereon in the opposite direction.

Although the operation of the machine will probably be understood from the foregoing, it may be briefly described as follows:

By means of one of the motors, the machine is propelled along the street, the power from the other motor being utilized for rapidly rotating the brush 34. This brush thoroughly sweeps the street and by means of the dust-pan 64 the sweepings are directed into the casing 55, and are partly thrown from the latter by centrifgal force, and partly blown by the air current generated by the brush, through the outlet 56 into the receiving compartment.

The sweepings are deposited in the sacks 36 and the air, but no dust, escapes through the several conduits 40, some of the dust settling in said sacks, while the remainder is collected in the dead air chamber C. When the sacks are filled, the jacks 79 may be operated to bodily raise the brush 34 and the casing 55, and driving of said brush may then be discontinued. The machine may now travel to any preferred point at which the sweepings are to be unloaded and when such point is reached, one or the other of the doors 50 is opened so that the racks 35 and the loaded bags 36 carried thereby are accessible. The first row of racks is now removed and emptied, the conveyer 47 is next operated to position the next row at the open door for removal, and this operation is continued until all of the racks have been removed. The sacks are removed from the racks and closed, and said racks are returned to the compartment R after suspending other sacks therein. Proper manipulation of the conveyer 47 is of assistance in returning the racks as well as removing them. The machine is now in condition for further use when the brush and its casing are again lowered to operative position, and it will be understood that whenever necessary the water spray from the pipe 72 may be utilized to dampen the brush, and that the brush bristles may be cleaned as required by operating the lever 60 to throw the scraper 58 against said bristles.

Since probably the best results are obtained from the construction shown and described, such construction may well be followed, but within the scope of the invention as claimed, numerous minor changes may well be made, and it will be understood that numerous details may be varied in the manufacture of the machine.

I claim:

1. A street sweeping machine comprising an elongated wheeled housing, a transverse partition dividing said housing into a front brush compartment and a rear receiving compartment, said partition terminating in spaced relation to the top of the housing, a transverse substantially cylindrical brush casing in said brush compartment having an outlet opening in its top, the portion of the casing behind said outlet opening extending downwardly to said partition and being hinged to allow vertical swinging of the brush casing within said housing, a combined brush and fan mounted in said brush casing and exposed at the lower side thereof for sweeping the street and blowing the sweepings through said outlet opening into the compartment, and a flexible sheet inclined rearwardly from the front edge of the aforesaid outlet opening to the top of the housing to guide the sweepings into the receiving compartment and permit vertical movement of said brush casing.

2. A street sweeping machine comprising a horizontally elongated wheeled housing, a partition dividing said housing into a front brush compartment and a rear receiving compartment, said housing having at its rear end a dead air chamber communicating with the receiving compartment, the bottom of said dead air chamber being spaced above the bottom of said receiving compartment while the upper portions of said compartment and chamber are provided with screened air outlets, and a combined brush and fan in said fan compartment for sweeping the street and blowing the sweepings into said receiving compartment and said dead air chamber.

3. A street sweeping machine comprising a wheeled housing having a receiving compartment provided with a door and with a horizontal conveyer leading to said door and forming the bottom of the compartment, together with bag racks in said compartment supported on said conveyer, and means for moving said conveyer after opening of said door.

4. A street sweeping machine comprising a wheeled housing having a receiving compartment provided in one side with an inlet, and means for blowing sweepings through said inlet into the compartment; together with a honey-comb of bag supporting frames extending across said compartment in a common plane inclined upwardly from the upper edge of the aforesaid inlet.

5. A street sweeping machine comprising a receiving compartment having an inlet in one side and means for blowing sweepings through said inlet into said compartment, together with a plurality of bag racks in said compartment each including a rectangular leg-supported frame having side bars of arched transverse section, the side bars of each frame lapping those of adjacent frames, and means for holding the bags open with their upper edges under said side bars.

6. A street sweeping machine comprising a housing divided into a brush compartment and a receiving compartment, a rotary brush in said brush compartment, a substantially cylindrical casing in which said brush is mounted, said casing being open at its bottom to expose the brush to the street and having an outlet at its top for discharging the sweepings into said receiving compartment, the portion of the peripheral wall of said casing, at the edge of the bottom opening toward which the brush bristles travel, being provided with a dust pan consisting of two pairs of side members hinged together and hinged to said edge, a pliable bottom extending between and secured to said side members, and means for swinging said dust pan upon its hinges as required.

In testimony whereof I have hereunto set my hand.

CHARLES WALTER LUND.